United States Patent
Zhong

(10) Patent No.: US 8,040,437 B2
(45) Date of Patent: *Oct. 18, 2011

(54) METHOD AND SYSTEM FOR ANALOG VIDEO NOISE DETECTION

(75) Inventor: Sheng Zhong, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 1451 days.

This patent is subject to a terminal disclaimer.

(21) Appl. No.: 11/313,592

(22) Filed: Dec. 20, 2005

(65) Prior Publication Data

US 2007/0139567 A1  Jun. 21, 2007

(51) Int. Cl.
*H04N 5/14* (2006.01)
*H04N 9/64* (2006.01)
*H04N 5/00* (2006.01)

(52) U.S. Cl. ......... 348/701; 348/607; 348/620; 348/622

(58) Field of Classification Search ............... 348/607, 348/615, 618, 620, 624, 699, 700, 701, 451, 348/452, 499

See application file for complete search history.

(56) References Cited

U.S. PATENT DOCUMENTS

| | | | |
|---|---|---|---|
| 5,290,356 A * | 3/1994 | Frankowski | 106/726 |
| 5,500,585 A | 3/1996 | Aab | |
| 5,657,401 A * | 8/1997 | De Haan et al. | 382/275 |
| 6,037,986 A * | 3/2000 | Zhang et al. | 375/240.12 |
| 6,061,100 A * | 5/2000 | Ward et al. | 348/607 |
| 6,335,990 B1 | 1/2002 | Chen et al. | |
| 6,563,550 B1 * | 5/2003 | Kahn et al. | 348/700 |
| 6,643,387 B1 | 11/2003 | Sethuraman et al. | |
| 7,110,455 B2 | 9/2006 | Wu et al. | |
| 7,145,607 B1 * | 12/2006 | Hui | 348/607 |
| 7,280,878 B1 | 10/2007 | Rossum | |
| 7,391,933 B2 | 6/2008 | Wang et al. | |
| 7,551,232 B2 | 6/2009 | Winger et al. | |
| 7,573,530 B2 | 8/2009 | Zhong | |
| 7,639,309 B2 | 12/2009 | Zhong | |
| 7,932,955 B2 | 4/2011 | Zhong | |
| 2002/0027610 A1 * | 3/2002 | Jiang et al. | 348/448 |
| 2007/0139560 A1 | 6/2007 | Zhong | |
| 2008/0062327 A1 | 3/2008 | MacInnis et al. | |

\* cited by examiner

*Primary Examiner* — Kelly L Jerabek

(74) *Attorney, Agent, or Firm* — McAndrews, Held & Malloy, Ltd.

(57) ABSTRACT

A method and system for analog video noise detection are provided. A motion metric (MM) value may be determined for pixels in a video image. The MM values may be collected and accumulated for a number of noise level intervals to determine average noise levels for each interval. An early-exit algorithm (EEA) or an interpolation estimate algorithm (IEA) may be utilized to determine the noise level. The EEA may select the noise level based on a first noise level interval with a number of collected samples larger than a threshold. The IEA may determine the noise level based on an average of a plurality of noise levels associated with consecutive noise level intervals with collected samples that are larger than the threshold. A noise level indicator (NLI) may be the noise level of the current image or an average based on noise levels from the current and previous images.

30 Claims, 10 Drawing Sheets

METHOD AND SYSTEM FOR ANALOG VIDEO NOISE DETECTION

CROSS-REFERENCE TO RELATED APPLICATIONS/INCORPORATION BY REFERENCE

This application makes reference to:
U.S. application Ser. No. 11/314,679 filed Dec. 20, 2005;
U.S. application Ser. No. 11/314,690 filed Dec. 20, 2005;
U.S. application Ser. No. 11/314,680 filed Dec. 20, 2005; and
U.S. application Ser. No. 11/313,871 filed Dec. 20, 2005.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of analog video signals. More specifically, certain embodiments of the invention relate to a method and system for analog video noise detection.

BACKGROUND OF THE INVENTION

In video system applications, random noise present in analog video signals, such as NTSC or PAL signals, for example, may result in images that are less than visually pleasing to the viewer. To address this problem, noise reduction (NR) operations may be utilized to remove or mitigate the analog noise present. However, some NR operations may result in visual artifacts such as motion trails, jittering, and/or wobbling that may result from excessive filtering. To reduce these effects, consideration may be given to whether the analog video noise is present in a static area or in an area where there is significant motion in the video content.

Some traditional NR operations may be performed independent of the analog noise level. For example, filter coefficients may be set conservatively to avoid over filtering for relatively clean videos. However, conservative filtering may result in many instances where noise remains in the video signal and affects the perceptual quality. Analog noise levels may be determined when conducting other traditional NR operations, however, the analog noise level may be determined by some external methods that do not explicitly operate on the video content. For example, the analog noise level may be estimated by measuring the variance in the blanking levels of the NSTC/PAL signal, usually by a module that is utilized to decode the NTSC/PAL signal. This approach makes the NR operation more tightly coupled with the NTSC/PAL decoding and not a separate or independent operation.

In order to improve NR operations it may be necessary to characterize the noise present in the video signal and select filter coefficients accordingly. However, noise characterization may be difficult to achieve since there may be many different noise sources. While white noise may be generally characterized as a Gaussian distribution in both the spatial and temporal domain, other types of analog noises in the video signals may not be easily estimated.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an analog video noise detection, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for an effective analog video noise detection algorithm. In one embodiment of the invention, a motion metric (MM) value may be determined for pixels in a video image. The MM values may be collected and accumulated into noise level intervals to determine an average noise level for each of the intervals. An early-exit algorithm (EEA) or an interpolation estimate algorithm (IEA) may be utilized to determine the video image noise level. The EEA may select the video image noise level base on a first noise level interval with a number of collected samples larger than a sample threshold. The IEA may determine the video image noise level based on an average of a plurality of noise levels associated with noise level intervals with collected samples that are larger than the sample threshold. A noise level indicator (NLI) for the current video image is an average based on noise levels from previous video images.

Figure 1:
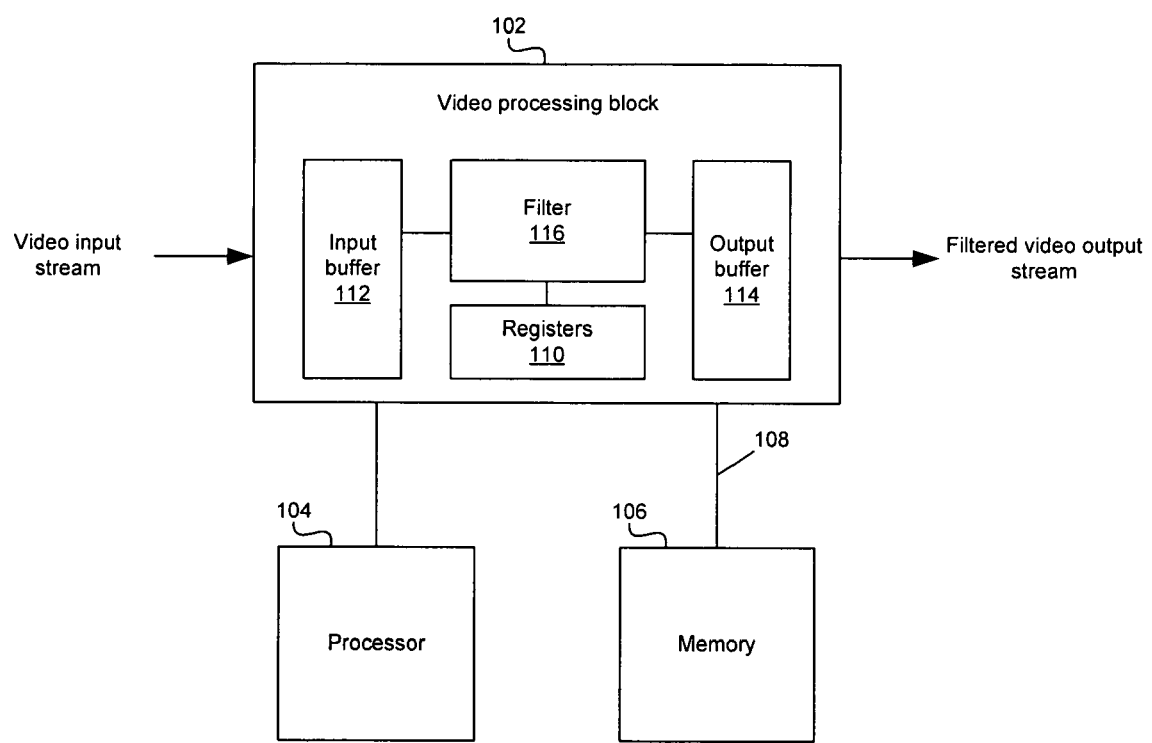
FIG. 1 is a block diagram of an exemplary video analog noise reduction system, in accordance with an embodiment of the invention.

FIG. 1 is a block diagram of an exemplary video analog noise reduction system, in accordance with an embodiment of the invention. Referring to FIG. 1, there is shown a video processing block 102, a processor 104, a memory 106, and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be adapted to filter pixels in a video frame or a video field from a video input stream to reduce analog noise. For example, video frames may be utilized in video systems that support progressive displays while video fields may be utilized in video systems that support interlaced displays. Video fields may alternate parity between top fields and bottom fields. A top field and a bottom field in an interlaced system may be deinterlaced or combined to produce a video frame.

The video processing block 102 may be adapted to receive a video input stream and, in some instances, to buffer at least a portion of the received video input stream in the input buffer 112. In this regard, the input buffer 112 may comprise suitable logic, circuitry, and/or code that may be adapted to store at least a portion of the received video input stream. Similarly, the video processing block 102 may be adapted to generate a filtered video output stream and, in some instances, to buffer at least a portion of the generated filtered video output stream in the output buffer 114. In this regard, the output buffer 114 may comprise suitable logic, circuitry, and/or code that may be adapted to store at least a portion of the filtered video output stream.

The filter 116 in the video processing block 102 may comprise suitable logic, circuitry, and/or code that may be adapted to perform an FIR filtering operation with noise reduction (FIR-NR) on a current pixel in a video frame or video field, to perform an IIR filtering operation with noise reduction (IIR-NR) on the current pixel, or to perform an FIR-IIR blended filtering operation with noise reduction (FIR-IIR-NR) on the current pixel. In this regard, the filter 116 may be adapted to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be adapted to store information that corresponds to filter coefficients, threshold levels, and/or constants, for example. Moreover, the registers 110 may be adapted to store information that corresponds to a selected filtering mode.

The processor 104 may comprise suitable logic, circuitry, and/or code that may be adapted to process data and/or perform system control operations. The processor 104 may be adapted to control at least a portion of the operations of the video processing block 102. For example, the processor 104 may generate at least one signal to control the selection of the filtering mode in the video processing block 102. Moreover, the processor 104 may be adapted to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108. The memory 106 may comprise suitable logic, circuitry, and/or code that may be adapted to store information that may be utilized by the video processing block 102 to reduce analog noise in the video input stream. The processor 104 may also be adapted to determine noise levels for a current video frame or video field based on an early-exit algorithm (EEA) or an interpolation estimate algorithm (IEA), for example. The memory 106 may be adapted to store filter coefficients, threshold levels, and/or constants, for example, to be utilized by the video processing block 102.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video frame in accordance with the filtering mode selected. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

Figure 2:
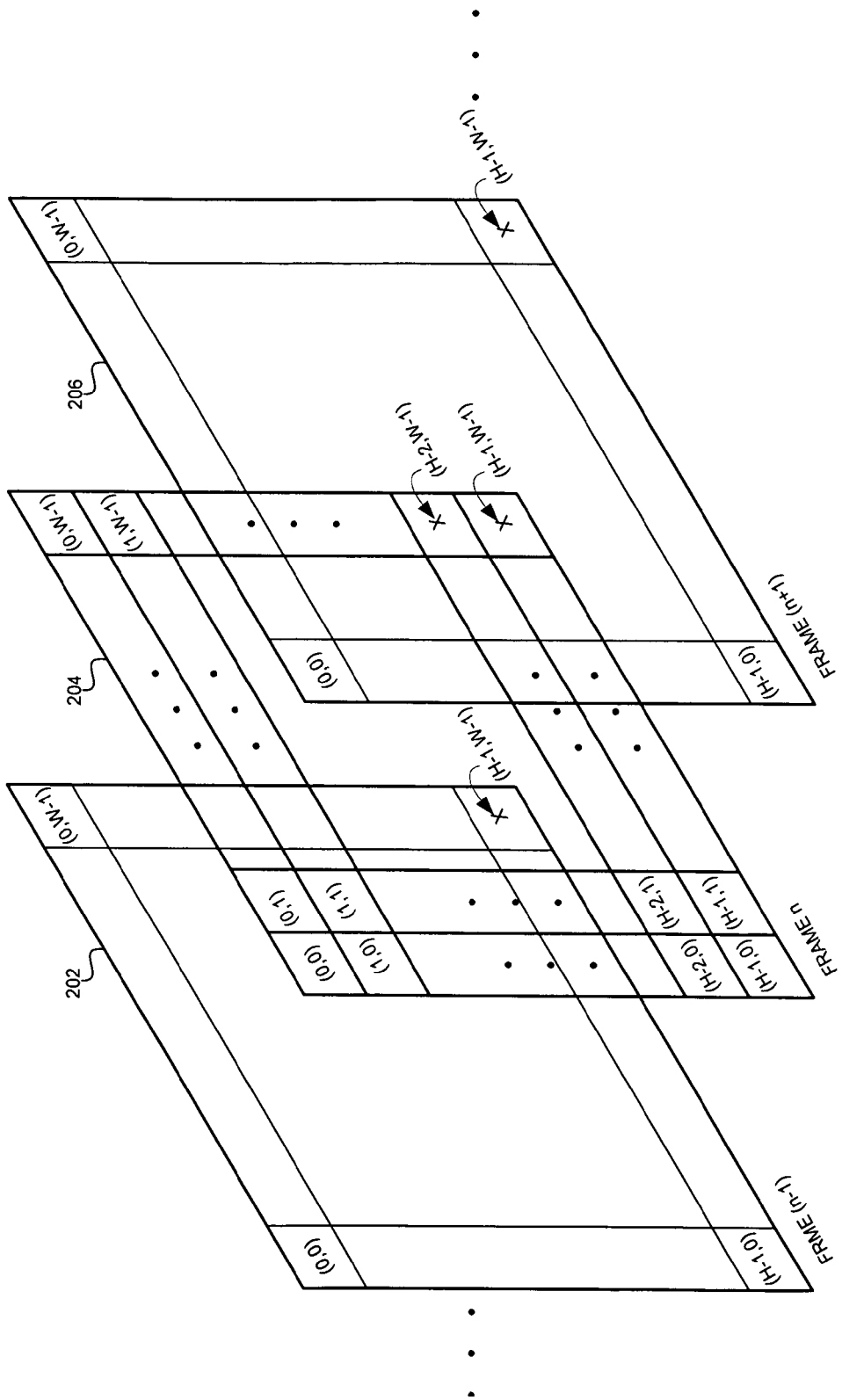
FIG. 2 is a diagram illustrating exemplary consecutive video frames for noise reduction operations, in connection with an embodiment of the invention.

FIG. 2 is a diagram illustrating exemplary consecutive video frames for noise reduction operations, in connection with an embodiment of the invention. Referring to FIG. 2, there is shown a current video frame 204, a previous video frame 202, and a next video frame 206. The current video frame 204 or FRAME n may correspond to a current frame being processed by the video processing block 102 in FIG. 1. The previous video frame 202 or FRAME (n−1) may correspond to an immediately previous frame to the current video frame 204. The next video frame 206 or FRAME (n+1) may correspond to an immediately next frame to the current video frame 204. The previous video frame 202, the current video frame 204, and/or the next video frame 206 may be processed directly from the video input stream or after being buffered in the video processing block 102, for example. The current video frame 204, the previous video frame 206, and the next video frame 208 may comprise luma (Y) and/or chroma (Cb, Cr) information.

Pixels in consecutive video frames are said to be collocated when having the same frame location, that is, . . . , $P_{n-1}(x,y)$, $P_n(x,y)$, $P_{n+1}(x,y)$, . . . , where $P_{n-1}$ indicates a pixel value in the previous video frame 202, $P_n$ indicates a pixel value in the current video frame 204, $P_{n+1}$ indicates a pixel value in the next video frame 206, and (x,y) is the common frame location between pixels. As shown in FIG. 2, for the frame location (x,y) is such that x=0, 1, ..., W−1 and y=0, 1, ..., H−1, where W is the picture width and H is the picture height, for example.

Operations of the video processing block 102 in FIG. 1 need not be limited to the use of exemplary consecutive video frames as illustrated in FIG. 2. For example, the video processing block 102 may perform filtering operations on consecutive video fields of the same parity, that is, on consecutive top fields or consecutive bottom fields. Accordingly, notions of difference between the terms "frame" and "field" should not limit the scope of various aspects of the present invention. When performing noise reduction operations on consecutive video fields of the same parity, pixels in the video processing block 102 are said to be collocated when having the same field location, that is, ..., $P_{n-1}(x,y)$, $P_n(x,y)$, $P_{n+1}(x,y)$, ..., where $P_{n-1}$ indicates a pixel value in a previous video field, $P_n$ indicates a pixel value in a current video field, $P_{n+1}$ indicates a pixel value in a next video field, and (x,y) is the common field location between pixels.

Figure 3A:
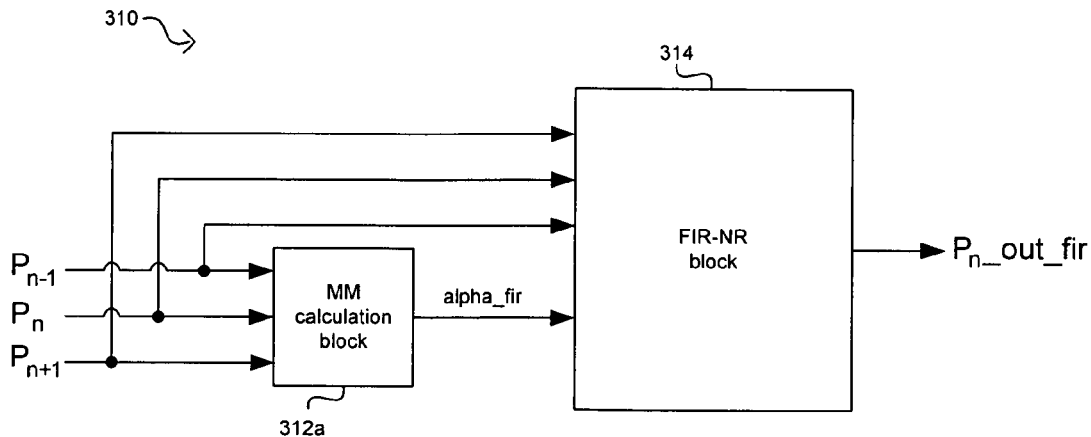
FIG. 3A is a block diagram of an exemplary finite impulse response (FIR) filtering system with noise reduction, in accordance with an embodiment of the invention.

FIG. 3A is a block diagram of an exemplary finite impulse response (FIR) filtering system with noise reduction, in accordance with an embodiment of the invention. Referring to FIG. 3A, there is shown an FIR filtering system 310 that may comprise a motion metric (MM) calculation block 312a and an FIR noise reduction (FIR-NR) block 314. The FIR filtering system 310 may be implemented as a portion of the video processing block 102 in FIG. 1, for example. The MM calculation block 312a may comprise suitable logic, circuitry, and/or code that may be adapted to determine a motion metric (MM) parameter based on contents from a current pixel, $P_n$, a previous collocated pixel, $P_{n-1}$, and a next collocated pixel, $P_{n+1}$. The MM calculation block 312a may utilize the MM parameter to determine an FIR blending factor, $\alpha_{fir}$.

The FIR blending factor, $\alpha_{fir}$, may be determined by a mapping operation of the motion information. This mapping operation may respond rapidly to motion to avoid unnecessary filtering in moving areas, for example. The FIR-NR block 314 may comprise suitable logic, circuitry, and/or code that may be adapted to FIR filter the current pixel, $P_n$. The FIR-NR block 314 may be adapted to perform a 3-tap FIR filtering operation given by the expression:

$$P_{n,fir}(x,y) = c_0 \cdot P_{n-1}(x,y) + c_1 \cdot P_n(x,y) + c_2 \cdot P_{n+1}(x,y), \quad (1)$$

where $c_0$, $c_1$, and $c_2$ are the 3-tap FIR filter coefficients. In this regard, the FIR filter coefficients may be stored in at least a portion of the registers 110 in FIG. 1, for example. The FIR-NR block 314 may be adapted to generate an FIR-blended current pixel, $P_{n,out\_fir}$, based on the expression:

$$P_{n,out\_fir}(x,y) = \alpha_{fir} \cdot P_n(x,y) + (1 - \alpha_{fir}) \cdot P_{n,fir}(x,y), \quad (2)$$

where $\alpha_{fir}$ is the FIR blending factor generated by the MM calculation block 312a. In this regard, equation (2) blends or combines the values of the current pixel and the FIR-filtered current pixel generated in equation (1). The level of blending provided by equation (2) is based on the value of the FIR blending factor, $\alpha_{fir}$.

In operation, the MM calculation block 312a and the FIR-NR block 314 may receive the current pixel, $P_n$, the previous collocated pixel, $P_{n-1}$, and the next collocated pixel, $P_{n+1}$. The MM calculation block 312a may utilize the contents of the received pixels to generate the FIR blending factor, $\alpha_{fir}$. The FIR-NR block 314 may utilize the contents of the received pixels to generate the FIR-filtered current pixel in accordance with equation (1). The FIR-NR block 314 may utilize the results from equation (1) and the FIR blending factor, $\alpha_{fir}$, generated by the MM calculation block 312a to generate the FIR-blended current pixel, $P_{n,out\_fir}$, in accordance with equation (2).

Figure 3B:
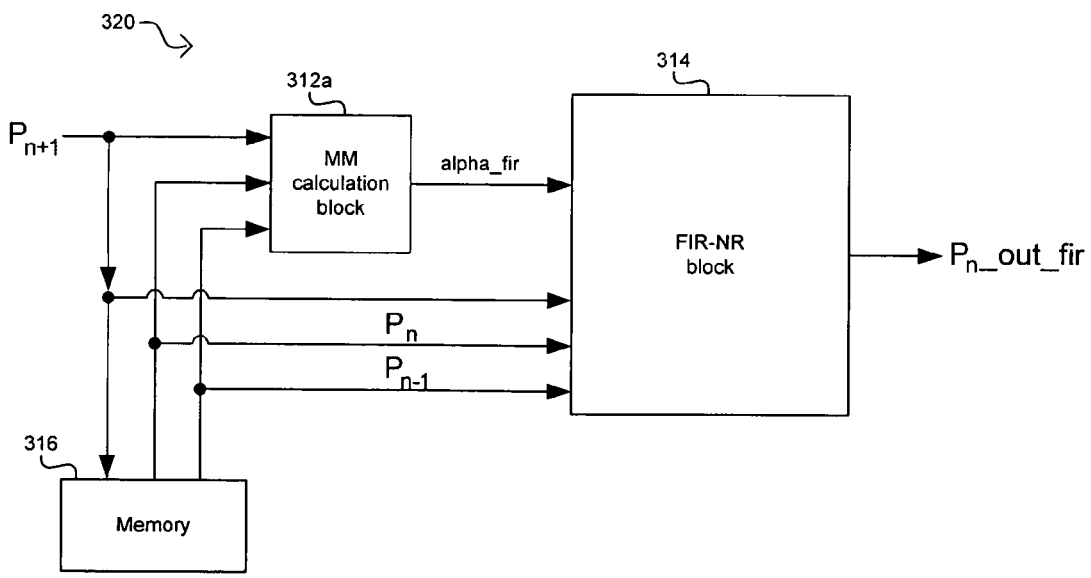
FIG. 3B is a block diagram of an exemplary finite impulse response (FIR) filtering system with noise reduction and frame storage, in accordance with an embodiment of the invention.

FIG. 3B is a block diagram of an exemplary finite impulse response (FIR) filtering system with noise reduction and frame storage, in accordance with an embodiment of the invention. Referring to FIG. 3B, there is shown an FIR filtering system 320 that may comprise the MM calculation block 312a and the FIR-NR block 314 in FIG. 3A and a memory 316. The FIR filtering system 320 may be implemented as a portion of the video processing block 102 in FIG. 1, for example. The memory 316 may comprise suitable logic, circuitry, and/or code that may be adapted to store at least a portion of video frames or video fields from the video input stream. The memory 316 may be adapted to store consecutive collocated pixels from the video input stream or from a buffered portion of the video input stream, for example. The memory 316 may be adapted to transfer stored pixels to the MM calculation block 312a and to the FIR-NR block 314 for processing.

In operation, the previous collocated pixel, $P_{n-1}$, may be received first and may be stored in the memory 316. The current pixel, $P_n$, may be received next and may also be stored in the memory 316. When the next collocated pixel, $P_{n+1}$, is received by the FIR filtering system 320, all three pixels necessary to generate the FIR blending factor, $\alpha_{fir}$, and to perform the operations described in equation (1) and equation (2) have been received. The next collocated pixel, $P_{n+1}$, may be transferred directly to the MM calculation block 312a and to the FIR-NR block 314 for processing. The current pixel, $P_n$, and the previous collocated pixel, $P_{n-1}$, may also be transferred from the memory 316 to the MM calculation block 312a and to the FIR-NR block 314 for processing. The next collocated pixel, $P_{n+1}$, may be stored in the memory 316 to be utilized as a current pixel and/or a previous collocated pixel in a subsequent operation of the FIR filtering system 320. In this regard, when the next collocated pixel, $P_{n+1}$, is being received and stored, the previous collocated pixel, $P_{n-1}$, and the current collocated pixel, $P_n$, may be fetched from the memory 316 for processing with the next collocated pixel, $P_{n+1}$, in the MM calculation block 312a and the FIR-NR block 314. Moreover, calculation of the motion metric by the MM calculation block 312a may require that a region of pixels in a neighborhood around the next collocated pixel, $P_{n+1}$, the previous collocated pixel, $P_{n-1}$, and the current collocated pixel, $P_n$, also be stored in the memory 316 and also be fetched from the memory 316 at the appropriate instance.

Motion-adaptive FIR-based filtering systems, such as those described in FIGS. 3A-3B may generally provide filtered outputs with few motion trail artifacts but may be limited in the amount of noise that may be reduced even for static areas in the video signal.

Figure 3C:
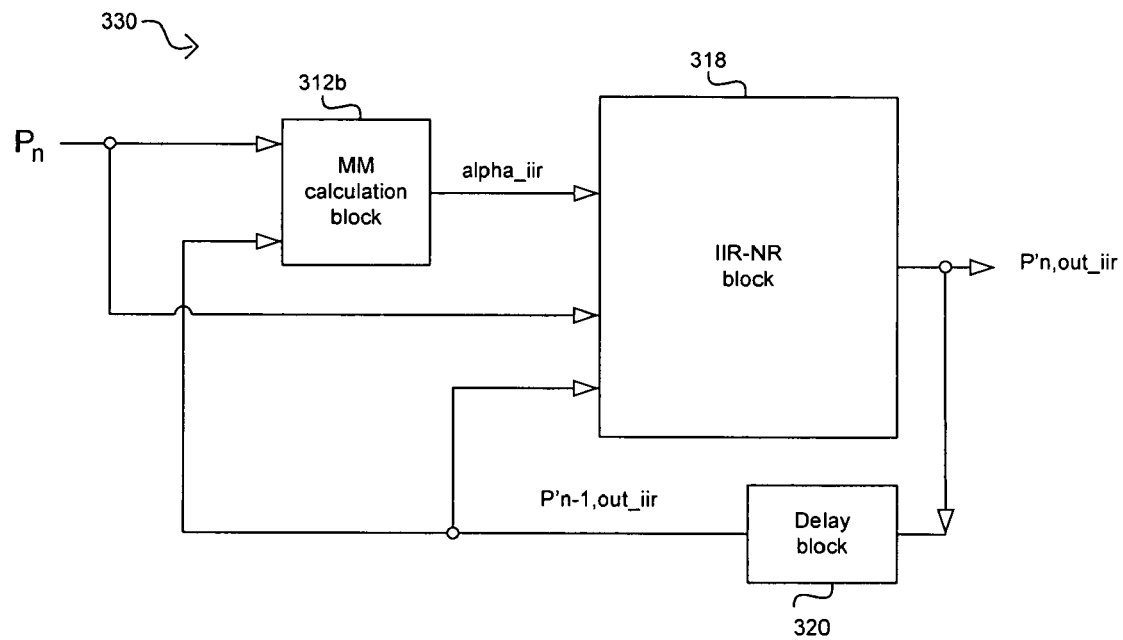
FIG. 3C is a block diagram of an exemplary infinite impulse response (IIR) filtering system with noise reduction, in accordance with an embodiment of the invention.

FIG. 3C is a block diagram of an exemplary infinite impulse response (IIR) filtering system with noise reduction, in accordance with an embodiment of the invention. Referring to FIG. 3C, there is shown an IIR filtering system 330 that may comprise an MM calculation block 312b, an IIR noise reduction (IIR-NR) block 318, and a delay block 320. The IIR filtering system 330 may be implemented as a portion of the video processing block 102 in FIG. 1, for example. The MM calculation block 312b may comprise suitable logic, circuitry, and/or code that may be adapted to determine a motion metric (MM) parameter based on contents from a current pixel, $P_n$, and from an IIR-filtered previous collocated pixel, $P'_{n-1}$. The MM calculation block 312b may utilize the MM parameter to determine an IIR blending factor, $\alpha_{iir}$. The IIR blending factor, $\alpha_{iir}$, may be determined by a mapping operation of the motion information. This mapping operation may respond rapidly to motion to avoid unnecessary filtering in moving areas, for example.

The IIR-NR block 318 may comprise suitable logic, circuitry, and/or code that may be adapted to IIR filter the current pixel, $P_n$. The IIR-NR block 318 may also be adapted to generate an IIR-blended current pixel given by the expression:

$$P'_{n,out\_iir}(x,y)=\alpha_{iir} \cdot P_n(x,y)+(1-\alpha_{iir}) \cdot P'_{n-1,out\_iir}(x,y), \quad (3)$$

where the IIR blending factor, $\alpha_{iir}$, controls the contribution of the IIR-filtered previous collocated pixel, $P'_{n-1}$, to the IIR-blended current pixel. The delay block 320 may comprise suitable logic, circuitry, and/or code that may be adapted to delay by one video frame or video field the transfer of the recursive feedback from the output of the IIR-NR block 318 to the MM calculation block 312b and to the input of the IIR-NR block 318. In this regard, both the MM calculation block 312b and the IIR-NR block 318 utilize a recursive feedback operation based on the IIR-filtered previous collocated pixel, $P'_{n-1}$.

In operation, the current pixel, $P_n$, and the IIR-filtered previous collocated pixel, $P'_{n-1}$, are received by the MM calculation block 312b and the IIR-NR block 318. The MM calculation block 312b may generate the IIR blending factor, $\alpha_{iir}$. The IIR-NR block 318 may IIR filter the current pixel, $P_n$, and may utilize the IIR-filtered current pixel and the IIR-filtered previous collocated pixel, $P'_{n-1}$, to perform the operation described by equation (3). The resulting IIR-blended current pixel may be transferred to the delay block 320 and may be utilized as the IIR-filtered previous collocated pixel, $P'_{n-1}$, for a subsequent operation in the IIR filtering system 330.

Motion-adaptive IIR filtering methods may achieve significant noise reduction but may result in artifacts such as motion trails and/or blurring of moving objects. To avoid these motion artifacts, IIR noise reduction operations may be configured conservatively, limiting, in some instances, the ability to reduce analog noise components.

Figure 4A:
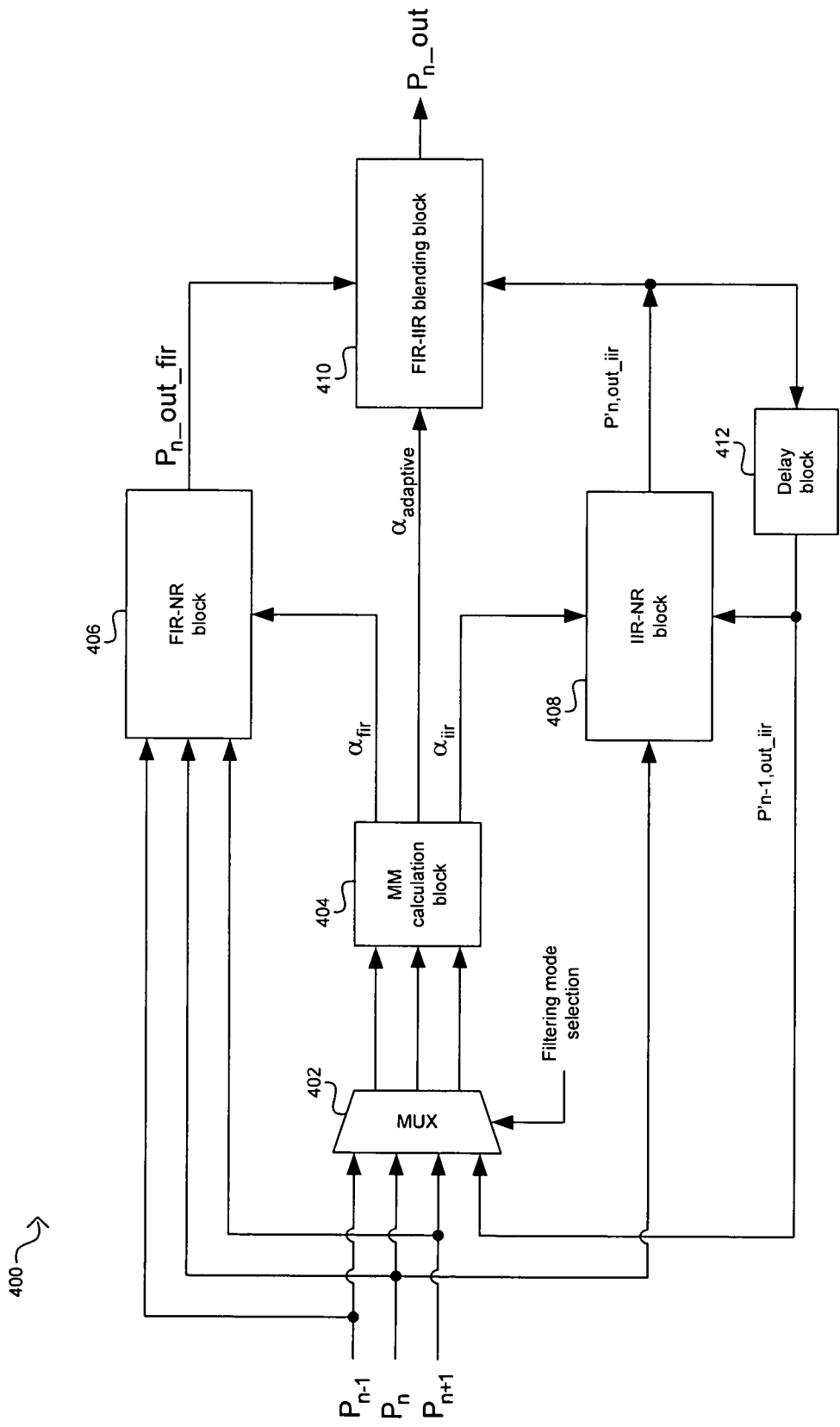
FIG. 4A is a block diagram of an exemplary FIR-IIR blended filtering system with noise reduction, in accordance with an embodiment of the invention.

FIG. 4A is a block diagram of an exemplary FIR-IIR blended filtering system with noise reduction, in accordance with an embodiment of the invention. Referring to FIG. 4A, there is shown an FIR-IIR blended filtering system 400 that may comprise a multiplexer (MUX) 402, an MM calculation block 404, an FIR-NR block 406, an IIR-NR block 408, an FIR-IIR blending block 410, and a delay block 412. The FIR-IIR blended filtering system 400 may be implemented as a portion of the video processing block 102 in FIG. 1, for example.

The MUX 402 may comprise suitable logic, circuitry, and/or or code that may be adapted to select the inputs to the MM calculation block 404 in accordance with a filtering mode. The MUX 402 may be adapted to select a previous collocated pixel, $P_{n-1}$, a current pixel, $P_n$, and a next collocated pixel, $P_{n+1}$, when an FIR filtering mode is selected. The MUX 402 may be adapted to select the current pixel, $P_n$, and the IIR-filtered previous collocated pixel, $P'_{n-1}$, when an IIR filtering mode is selected. When an adaptive FIR-IIR filtering mode is selected, the MUX 402 may be adapted to first select the pixels necessary for FIR filtering and then select the pixels necessary for IIR filtering. In another embodiment of the invention, when the adaptive FIR-IIR filtering mode is selected, the MUX 402 may be adapted to first select the pixels necessary for IIR filtering and then select the pixels necessary for FIR filtering.

In another embodiment of the invention, when the adaptive FIR-IIR filtering mode is selected, for example, the MUX 402 may enable selection of the IIR-filtered previous collocated pixel, $P'_{n-1}$, a current pixel, $P_n$, and a next collocated pixel, $P_{n+1}$.

The MM calculation block 404 may comprise suitable logic, circuitry, and/or code that may be adapted to determine a motion metric (MM) parameter based on contents from at least one of the current pixel, $P_n$, the previous collocated pixel, $P_{n-1}$, the next collocated pixel, $P_{n+1}$, and the IIR-filtered previous collocated pixel, $P'_{n-1}$. The MM calculation block 404 may be adapted to generate a different MM parameter for each of the filtering modes supported by the FIR-IIR blended filtering system 400. For example, when the FIR-IIR blended filtering system 400 supports an FIR filtering mode, an IIR filtering mode, and an adaptive FIR-IIR filtering mode, the MM calculation block 404 may be adapted to determine three different MM parameters. The MM calculation block 404 may be adapted to generate an FIR blending factor, $\alpha_{fir}$, an IIR blending factor, $\alpha_{iir}$, and/or an adaptive FIR-IIR blending factor, $\alpha_{adaptive}$. The MM calculation block 404 may generate the blending factors based on the MM parameter for the filtering mode selected, for example.

The MM parameter generated by the MM calculation block 404 may comprise a luminance (Y) component, $MM_Y(x,y)$, and two chrominance (Cb, Cr) components, $MM_{Cb}(x,y)$ and $MM_{Cr}(x,y)$. The luminance component of the MM parameter may be determined based on the expression:

$$MM_y(x, y) = \frac{1}{w \times h} \sum_{(i,j)} |Diff_n(i, j)|, \quad (4)$$

where w and h are the width and height of a window or neighborhood around the pixel location (x,y), i and j may correspond to indices that may be utilized to identify the location of pixels in the neighborhood, $Diff_n(i,j)$ is a differential variable that may be determined in accordance with the filtering mode selected, and $\Sigma|Diff_n(i,j)|$ is a sum of the absolute values of the differential variables determined in the neighborhood of size w×h. The neighborhood size may be determined by taking into consideration the effect on moving impulses, generally thin edges, and/or the effect on smoothing out noise, for example. Some exemplary neighborhood sizes may be 3×3, 5×3, 3×5, 7×3, 5×5, 7×5, and 7×7, for example. Selection of a neighborhood size may depend, at least in part, on implementation requirements.

The values of $Diff_n(i,j)$ in equation (4) may be determined based on the following expressions:

$$Diff_n(i,j)=2*(|P_n(i,j)-P_{n-1}(i,j)|+|P_n(i,j)-P_{n+1}(i,j)|), \quad (5)$$

$$Diff_n(i,j)=4*(|P_n(i,j)-P'_{n-1}(i,j)|), \quad (6)$$

$$Diff_n(i,j)=2*(|P_n(i,j)-P'_{n-1}(i,j)|+|P_n(i,j)-P_{n+1}(i,j)|), \quad (7)$$

where equation (5) may be utilized when the FIR filtering mode is selected, equation (6) may be utilized when the IIR filtering mode is selected, and equation (7) may be utilized when the adaptive FIR-IIR filtering mode is selected. The factor 2 in equation (5) and equation (7) and the factor 4 in equation (6) may depend on the implementation of the FIR-IIR blended filtering system 400 and may be utilized to maintain a specified precision for integer operations. In this regard, the factors in equation (5), equation (7), and equation (6) need not be limited to the examples provided.

The chrominance components of the MM parameter, $MM_{Cb}(x,y)$ and $MM_{Cr}(x,y)$, may be determined by following an approach substantially as described for determining equation (4). In this regard, determining the chrominance components may require consideration of the lower resolution of the chrominance components to the luma component in 4:2:2 video format, for example. The MM parameter determined by the MM calculation block 404 may be given by the expression:

$$MM(x,y) = w_0 \cdot MM_L(x,y) + w_1 \cdot MM_{Cb}(x,y) + w_2 \cdot MM_{Cr}(x,y), \quad (8)$$

where $w_0$, $w_1$, and $w_2$ are weight factors that may be utilized to value differently the contribution of the luminance and chrominance components to the MM parameter. The weight factors $w_0$, $w_1$, and $w_2$ may satisfy the conditions that $w_0 + w_1 + w_2 = 1$. When setting $w_0 > w_1$, and $w_0 > w_2$, the luma component may contribute more than the chroma component, for example. The weight factors $w_0$, $w_1$, and $w_2$ may be stored in the registers 110 in FIG. 1, for example.

The MM calculation block 404 may be adapted to generate the blending factors $\alpha_{fir}$, $\alpha_{iir}$, and $\alpha_{adaptive}$ based on the following expression:

$$\alpha = K_0(1 - (K_1/MM^2)), \quad (9)$$

where $K_0$ and $K_1$ are factors determined for each of the blending factors and MM is the MM parameter determined in equation (8) for a selected filtering mode. For example, the factors $K_{0, FIR}$ and $K_{1, FIR}$ may be utilized to determine $\alpha_{fir}$, the factors $K_{0, IIR}$ and $K_{1, IIR}$ may be utilized to determine $\alpha_{iir}$, and the factors $K_{0, adaptive}$ and $K_{1, adaptive}$ may be utilized to determine $\alpha_{adaptive}$. The non-linearity of equation (9) may enable the blending factors to increase more rapidly as the MM parameter increases and avoid artifacts such as motion blurriness or motion trails for moving objects, for example. Moreover, the non-linear behavior of the blending factors may allow moving content to retain its sharpness.

The MM calculation block 404 may also be adapted to generate noise levels for a plurality of noise level intervals that may be utilized to determine and/or detect the analog video noise level in a current video field or video frame. In this regard, the MM calculation block 404 may utilize the MM parameters and may collect and accumulate the MM parameters into corresponding noise level intervals to determine the noise level corresponding to each of the noise level intervals. The noise level intervals may be determined from information stored in at least a portion of the registers 110. For example, the registers 110 may comprise information regarding the number of noise level intervals, the noise level interval lower threshold, NOISE_RANGE_LOWER_THD, and/or the noise level interval upper threshold, NOISE_RANGE_UPPER_THD. The MM calculation block 404 may generate the noise levels for each of the noise level intervals and may store the results in at least a portion of the registers 110, for example. In this regard, the processor 104 may utilize the noise levels determined by the MM calculation block 404 by retrieving the information from the registers 110, for example.

The FIR-NR block 406 may comprise suitable logic, circuitry, and/or code that may be adapted to generate an FIR-blended current pixel, $P_{n,out\_fir}$, in accordance with equation (1) and equation (2) and utilizing the FIR blending factor, $\alpha_{fir}$, generated by the MM calculation block 404. The FIR-NR block 406 may receive the current pixel, $P_n$, the previous collocated pixel, $P_{n-1}$, and the next collocated pixel, $P_{n+1}$, directly from the video input stream or from the input buffer 112 in FIG. 1, for example. In some implementations, at least a portion of the received data, such as the value of the current pixel, $P_n$, and the value of the previous collocated pixel, $P_{n-1}$, for example, may be fetched from the memory 106 in FIG. 1 to the input buffer 112 in the video processing block 102, for example. The FIR-NR block 406 may transfer the FIR-blended current pixel, $P_{n,out\_fir}$, to the FIR-IIR blending block 410 for processing.

The IIR-NR block 408 may comprise suitable logic, circuitry, and/or code that may be adapted to generate an IIR-blended current pixel, $P'_{n,out\_iir}$, in accordance with equation (3) and utilizing the IIR blending factor, $\alpha_{iir}$, generated by the MM calculation block 404. The IIR-NR block 408 may receive the current pixel, $P_n$, directly from the video input stream or from the input buffer 112 in FIG. 1, for example. The IIR-NR block 408 may receive IIR-filtered previous collocated pixel, $P'_{n-1}$, from the delay block 412. The IIR-NR block 408 may transfer the IIR-blended current pixel, $P'_{n,out\_iir}$, to the FIR-IIR blending block 410 for processing and to the delay block 412 for storage. The delay block 412 may comprise suitable logic, circuitry, and/or code that may be adapted to store the IIR-blended current pixel, $P'_{n,out\_iir}$, for one video frame or video field. After one video frame or video field, the IIR-blended current pixel, $P'_{n,out\_iir}$, stored in the delay block 412 may correspond to the IIR-filtered previous collocated pixel, $P'_{n-1}$. The delay block 412 may be adapted to transfer the IIR-filtered previous collocated pixel, $P'_{n-1}$, to the MUX 402 and to the IIR-NR block 408 for processing.

The FIR-IIR blending block 410 may comprise suitable logic, circuitry, and/or code that may be adapted to receive the FIR-blended current pixel, $P_{n,out\_fir}$, from the FIR-NR block 406 and the IIR-blended current pixel, $P'_{n,out\_iir}$, from the IIR-NR block 408 and generate a filtered output pixel, $P_{n,out}$. In this regard, the FIR-IIR blending block 410 may utilize the adaptive FIR-IIR blending factor, $\alpha_{adaptive}$, generated by the MM calculation block 404. The filtered output pixel, $P_{n,out}$, may be generated in accordance with the following expression:

$$P_{n,out}(x,y) = \alpha_{adaptive} \cdot P_{n,out\_fir}(x,y) + (1 - \alpha_{adaptive}) \cdot P'_{n,out\_iir}(x,y) \quad (10)$$

where the adaptive FIR-IIR blending factor, $\alpha_{adaptive}$, blends the values of the FIR-blended current pixel, $P_{n,out\_fir}$, and the IIR-blended current pixel, $P'_{n,out\_iir}$.

In operation, the current pixel, $P_n$, the previous collocated pixel, $P_{n-1}$, the next collocated pixel, $P_{n+1}$, and the IIR-filtered previous collocated pixel, $P'_{n-1}$, may be received by the MUX 402. The filtering mode may be selected and the appropriate pixel values may be transferred from the MUX 402 to the MM calculation block 404. The MM calculation block 404 may determine the MM parameter based on the filtering mode selected and may generate the blending factors $\alpha_{fir}$, $\alpha_{iir}$, and $\alpha_{adaptive}$. The MM calculation block 404 may transfer the corresponding blending factor to the FIR-NR block 406, the IIR-NR block 408, and the FIR-IIR blending block 410. The FIR-NR block 406 may FIR filter the current pixel, $P_n$, and generate the FIR-blended current pixel, $P_{n,out\_fir}$, based on the FIR blending factor, $\alpha_{fir}$. The IIR-NR block 408 may IIR filter the current pixel, $P_n$, and generate the IIR-blended current pixel, $P'_{n,out\_iir}$, based on the IIR blending factor, $\alpha_{iir}$. The IIR-blended current pixel, $P'_{n,out\_iir}$, may be transferred to the delay block 412. The FIR-IIR blending block 410 may receive the FIR-blended current pixel, $P_{n,out\_fir}$, and the IIR-blended current pixel, $P'_{n,out\_iir}$, and may generate the filtered output pixel, $P_{n,out}$, by utilizing the adaptive FIR-IIR blending factor, $\alpha_{adaptive}$, generated by the MM calculation block 404.

Figure 4B:
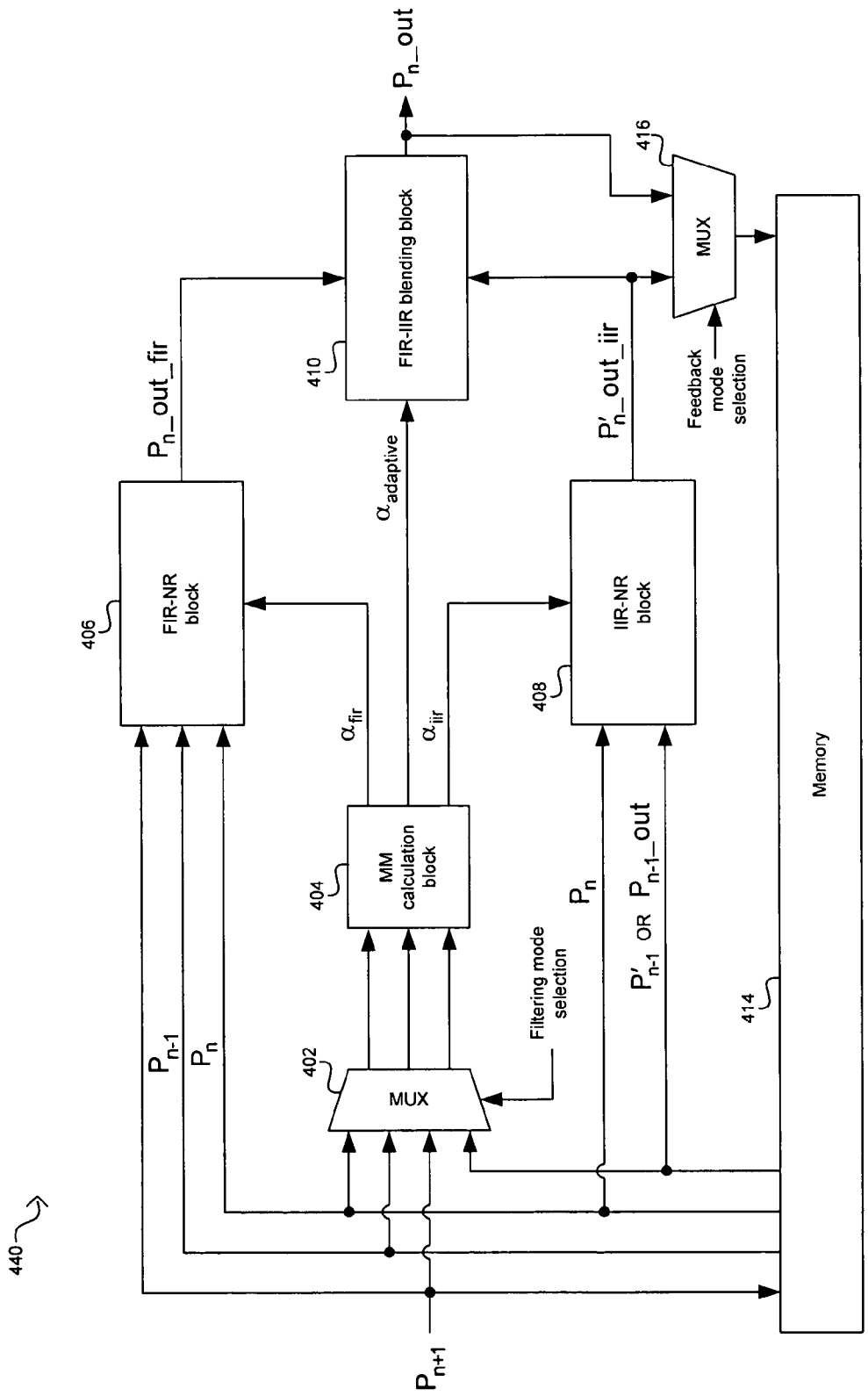
FIG. 4B is a block diagram of an exemplary FIR-IIR blended filtering system with noise reduction and frame storage for IIR filtering or FIR-IIR filtering feedback, in accordance with an embodiment of the invention.

FIG. 4B is a block diagram of an exemplary FIR-IIR blended filtering system with noise reduction and frame storage for IIR filtering or FIR-IIR filtering feedback, in accordance with an embodiment of the invention. Referring to FIG. 4B, there is shown an FIR-IIR blended filtering system 440 that may comprise the MUX 402, the MM calculation block 404, the FIR-NR block 406, the IIR-NR block 408, the FIR-IIR blending block 410, the memory 414, and a multiplexer (MUX) 416. The FIR-IIR blended filtering system 440 may be implemented as a portion of the video processing block 102 in FIG. 1, for example. The MUX 416 may comprise suitable logic, circuitry, and/or code that may be adapted to select between storing into the memory 414 a filtered output pixel, $P_{n,out}$, from the FIR-IIR blending block 410 or an IIR-blended current pixel, $P'_{n,out\_iir}$, from the IIR-NR block 408. In this regard, the MUX 416 may be utilized to select a feedback mode of operation for the FIR-IIR blended filtering system 440.

The memory 414 in FIG. 4B may be adapted to store a current pixel, $P_n$, a previous collocated pixel, $P_{n-1}$, a filtered output pixel, $P_{n,out}$, from an immediately previous filtering operation by the FIR-IIR blended filtering system 440, and/or an IIR-blended current pixel, $P'_{n,out\_iir}$, for example. When the filtered output pixel, $P_{n,out}$, is selected for storage by the MUX 416, after one video frame or video field the filtered output pixel, $P_{n,out}$, stored in the memory 414 may correspond to a previous filtered output pixel, $P_{n-1,out}$. Similarly, when the IIR-blended current pixel, $P'_{n,out\_iir}$, is selected for storage by the MUX 416, after one video frame or video field the IIR-blended current pixel, $P'_{n,out\_iir}$, stored in the memory 414 may correspond to an IIR-filtered previous collocated pixel, $P'_{n-1}$. The IIR-NR block 408 in FIG. 4B may be adapted to generate an IIR-blended current pixel, $P'_{n,out\_iir}$, based on the current pixel, $P_n$, and either the previous filtered output pixel, $P_{n-1,out}$, or the IIR-filtered previous collocated pixel, $P'_{n-1}$, in accordance with the feedback mode selection.

In operation, the previous collocated pixel, $P_{n-1}$, may be received first and may be stored in the memory 414. The current pixel, $P_n$, may be received next and may also be stored in the memory 414. The MUX 416 may select to store in the memory 414 the filtered output pixel, $P_{n,out}$, from an immediately previous filtering operation by the FIR-IIR blended filtering system 430. In the alternative, the MUX 416 may select to store in the memory 414 the IIR-blended current pixel, $P'_{n,out\_iir}$. When the next collocated pixel, $P_{n+1}$, is received, all necessary pixel values for generating the current filtered output pixel, $P_{n,out}$, are available to the FIR-IIR blended filtering system 430. The previous collocated pixel, $P_{n-1}$, the current pixel, $P_n$, and the previous filtered output pixel, $P_{n-1,out}$, or the IIR-filtered previous collocated pixel, $P'_{n-1}$, may be transferred from the memory 414 to the MUX 402, the FIR-NR block 406, and/or the IIR-NR block 408. In this regard, the operations for generating the current filtered output pixel, $P_{n,out}$, by the FIR-IIR blended filtering system 440 may be substantially as described in FIG. 4A.

Figure 5:
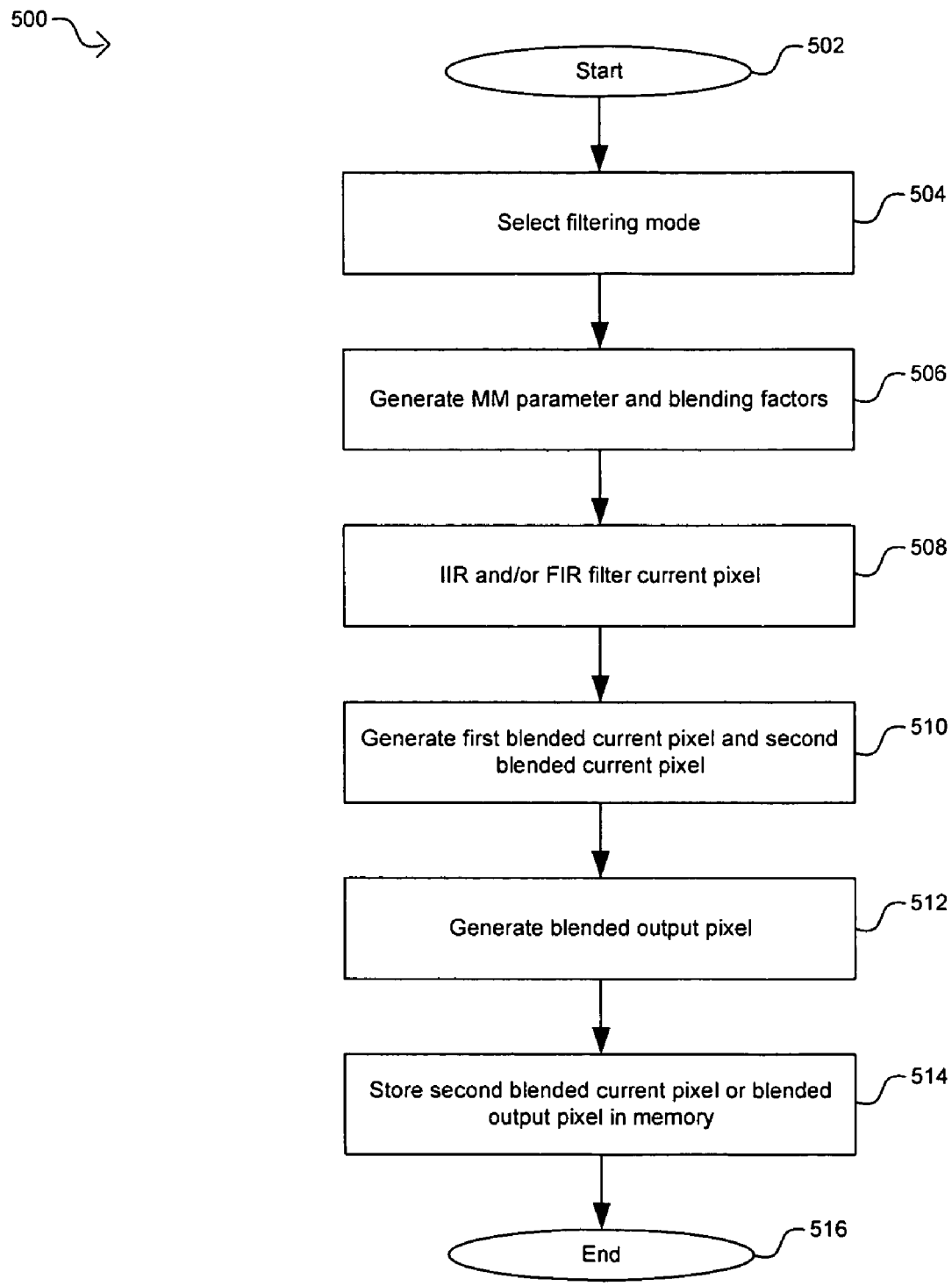
FIG. 5 is a flow diagram illustrating exemplary steps for the operation of the FIR-IIR blended filtering system, in accordance with an embodiment of the invention.

FIG. 5 is a flow diagram with exemplary steps illustrating the operation of the FIR-IIR blended filtering system, in accordance with an embodiment of the invention. Referring to FIG. 5, there is shown a flow diagram 500. In step 504, after start step 502, the processor 104 in FIG. 1 may select a filtering mode of operation. The processor 104 may select between an FIR filtering mode, an IIR filtering mode, and an adaptive FIR-IIR filtering mode. The selected filtering mode may be utilized to control the operation of the MUX 402 in FIG. 4A, for example.

In step 506, the MM calculation block 404 may utilize the pixel information received from the MUX 402 to generate the appropriate MM parameter in accordance with the selected filtering mode. The MM calculation block 404 may generate the appropriate blending factors based on the generated MM parameter. For example, for the FIR blending mode, the FIR blending factor, $\alpha_{fir}$, may be generated and the adaptive FIR-IIR blending factor, $\alpha_{adaptive}$, may be set to 1. This approach may result in a filtered output pixel, $P_{n,out}$, in equation (10) that may depend on the FIR-blended current pixel, $P_{n,out\_fir}$, generated by the FIR-NR block 406. In another example, for the IIR blending mode, the IIR blending factor, $\alpha_{iir}$, may be generated and the adaptive FIR-IIR blending factor, $\alpha_{adaptive}$, may be set to 0. This approach may result in a filtered output pixel, $P_{n,out}$, in equation (10) that may depend on the IIR-blended current pixel, $P'_{n,out\_iir}$, generated by the IIR-NR block 408. In another example, for the adaptive FIR-IIR filtering mode, the blending factors $\alpha_{fir}$, $\alpha_{iir}$, and $\alpha_{adaptive}$ may be generated by the MM calculation block 404.

In step 508, the FIR-NR block 406 may FIR filter the current pixel, $P_n$, based on filter coefficients provided from the registers 110 in FIG. 1 and the values of the previous collocated pixel, $P_{n-1}$, and the next collocated pixel, $P_{n+1}$. The IIR-NR block 408 may IIR filter the current pixel, $P_n$, by recursive feedback of the IIR-filtered previous collocated pixel, $P'_{n-1}$. In step 510, the FIR-NR block 406 may generate the FIR-blended current pixel, $P_{n,out\_fir}$, and the IIR-NR block 408 may generate the IIR-blended current pixel, $P'_{n,out\_iir}$. In this regard, the FIR-blended current pixel, $P_{n,out\_fir}$, may correspond to a first blended current pixel for an FIR-IIR blended filtering system and the IIR-blended current pixel, $P'_{n,out\_iir}$, may correspond to a second blended current pixel for the FIR-IIR blended filtering system.

In step 512, the FIR-IIR blending block 410 may generate the filtered output pixel, $P_{n,out}$, by blending the FIR-blended current pixel, $P_{n,out\_fir}$, from the FIR-NR block 406 and the IIR-blended current pixel, $P'_{n,out\_iir}$, from the IIR-NR block 408 based on the adaptive FIR-IIR blending factor, $\alpha_{adaptive}$. In step 514, the filtered output pixel, $P_{n,out}$, or the IIR-blended current pixel, $P'_{n,out\_iir}$, may be stored in the memory 414 for subsequent filtering operations. In this regard, the MUX 416 in FIG. 4B may be utilized to select a feedback mode of operation that may best suit the operational and/or architectural requirements of the system. After step 514, the process may proceed to end step 516.

The noise level of a current video frame may be determined by considering the statistical behavior of the $\text{Diff}_n(i,j)$ operation as described in equation (5), equation (6), and equation (7) for the various filtering modes supported by the video processing block 102 in FIG. 1. For example, when video frames or video fields are static, the operation $\text{Diff}_n(i,j)$ may be a random noise that follows a half-Gaussian distribution, for example. In this regard, the mean of $\text{Diff}_n(i,j)$ may be approximately $3.2\sigma$ and the variance may be $1.7\sigma$ for the adaptive FIR-IIR filtering mode, $1.7\sigma$ for the FIR filtering mode, and $2.4\sigma$ for the IIR filtering mode, for example. In accordance with the Central Limit Theorem, the MM parameter, $MM(x,y)$, may follow approximately a Gaussian distribution, for example, with a mean value of $3.2\sigma$ and variances given by the expressions:

$$\sigma_1 = \frac{1.7\sigma}{\sqrt{w*h}}, \quad (11a)$$

$$\sigma_1 = \frac{2.4\sigma}{\sqrt{w*h}}, \quad (11b)$$

where equation (11a) corresponds to the variance for the adaptive FIR-IIR filtering mode and the FIR filtering mode, and equation (11b) corresponds to the variance for the IIR filtering mode. In accordance with the Large Sample Theorem, the average value of the MM parameter, $MM(x,y)$, over a large number of samples may be approaching its statistical mean value of 3.2σ. In this regard, the mean value for the MM parameter, MM(x,y), may be calculated by averaging over a large portion of the video frame.

In addition to the MM parameter as defined by equation (4) through equation (8), the motion metric utilized for noise reduction and noise estimation may be based on, for example, mean square error (MSE) calculations. In this regard, values of $\text{Diff}_n(i,j)$ in equation (4) may be determined based on the following expressions:

$$\text{Diff}_n(i,j)=2*(|P_n(i,j)-P_{n-1}(i,j)|^2+|P_n(i,j)-P_{n+1}(i,j)|^2), \quad (12)$$

$$\text{Diff}_n(i,j)=4*(|P_n(i,j)-P'_{n-1}(i,j)|^2), \quad (13)$$

$$\text{Diff}_n(i,j)=2*(|P_n(i,j)-P'_{n-1}(i,j)|^2+|P_n(i,j)-P_{n+1}(i,j)|^2), \quad (14)$$

where equation (12) may be utilized when the FIR filtering mode is selected, equation (13) may be utilized when the IIR filtering mode is selected, and equation (14) may be utilized when the adaptive FIR-IIR filtering mode is selected. The factor 2 in equation (12) and equation (14) and the factor 4 in equation (13) may depend on the implementation of the FIR-IIR blended filtering system 400 and may be utilized to maintain a specified accuracy for integer operations.

For MSE-based motion metric calculations, the operation $\text{Diff}_n(i,j)$ may be a random noise that follows a Gaussian distribution, for example. In accordance with the Central Limit Theorem, the mean value of $\text{Diff}_n(i,j)$ may be approximately $4\sigma_2$ and the variances may be by the expressions:

$$\sigma_1 = \frac{4\sigma^2}{\sqrt{w*h}} \quad (15a)$$

$$\sigma_1 = \frac{5.66\sigma^2}{\sqrt{w*h}} \quad (15b)$$

where equation (15a) corresponds to the variance for the adaptive FIR-IIR filtering mode and the FIR filtering mode, and equation (15b) corresponds to the variance for the IIR filtering mode. In accordance with the Large Sample Theorem, the average value of the MM parameter, MM(x,y), over a large number of samples may approach its statistical mean value of 3.2σ. In this regard, the mean value for the MM parameter, MM(x,y), may be calculated by averaging over a large portion of the video frame.

In performing noise level estimation for a video frame or video field, it may be necessary to constrain the samples of the MM parameter, MM(x,y), to within a certain range of the statistical mean value of 3.2σ. For example, when including samples that result in MM values falling within $6\sigma_1$ of the mean value ($3.2\sigma\pm6\sigma_1$), more than 99.99999% of the meaningful samples, that is, truly noisy samples, may be included. Those samples that result in MM values falling beyond this range and are therefore excluded from noise detection, are more likely as a result of content motion that caused the MM parameter values to increase. Similarly, when including samples that result in MM values falling within $3\sigma_1$ of the mean value ($3.2\sigma\pm3\sigma_1$), more than 99.9% of the meaningful samples, that is, truly noisy samples, may be included.

In most instances, the range $3.2\sigma\pm6\sigma_1$ may be utilized for generating noise level intervals to determine the noise level of a current video frame or video field. Each of the generated MM parameters for the pixels in a video frame or video field may be associated with one of the noise level intervals. The collection and accumulation of MM parameters in the noise level intervals may be utilized to determine a video frame or video field noise level. In this regard, a video frame or video field may also be referred to as a video image.

Table 1 and Table 2 provide correspondences between exemplary noise levels to the intervals for the ranges $3.2\sigma\pm6\sigma_1$ and $3.2\sigma\pm3\sigma_1$ respectively, where $\sigma_1$ is given by equation (11b) in both instances. In both tables, there are shown five (5) noise interval levels that may be utilized to determine the noise level of the video image. The first column, comprising signal-to-noise ratio (SNR) values, may provide the noise level in dB for each noise level interval. For example, a pixel with a 45 dB SNR corresponds to a pixel with lower noise level than a pixel with 40 dB SNR. The second column, comprising the $3.2\sigma\pm6\sigma_1$ or $3.2\sigma\pm3\sigma_1$ ranges from the mean values of MM for true noisy samples, may provide the exemplary range of values from the mean value associated with the specified SNR values. The third column, comprising the mean values of MM for true noisy samples, may provide the exemplary mean values associated with the specified SNR values.

Figure 6:
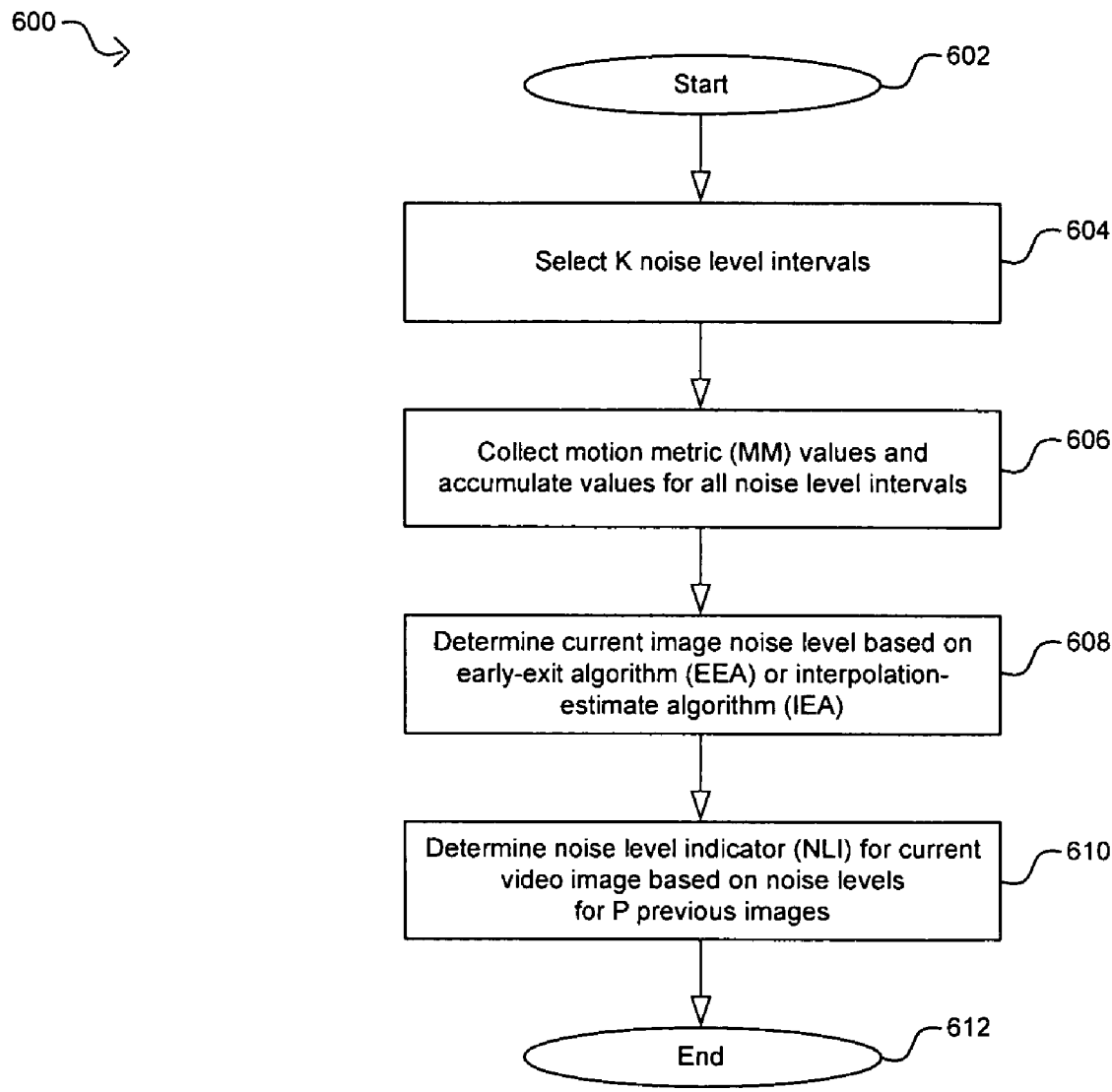
FIG. 6 is a flow diagram illustrating exemplary steps for noise level detection in a current video frame or video field, in accordance with an embodiment of the invention.

FIG. 6 is a flow diagram illustrating exemplary steps for noise level detection in a current video frame or video field, in accordance with an embodiment of the invention. Referring to FIG. 6, there is shown a flow chart 600 that illustrates noise level detection. In step 604, after start step 602, a number K of noise level intervals may be selected for determining the noise level of a current video image. Each noise level interval may be defined by a noise level interval lower threshold, NOISE_RANGE_LOWER_THD[k], and a noise level interval upper threshold, NOISE_RANGE_UPPER_THD[k], where $0\leq k<K-1$ is an index indicating the noise level interval being considered. To each noise level interval corresponds a noise level, NOISE_LEVEL[k], to be determined. The values of NOISE_RANGE_LOWER_THD[k] and NOISE_RANGE_UPPER_THD[k] may be determined from, for example, the range values in Table 1 and Table 2. Moreover, to each noise level interval also corresponds an interval sample number, SAMPLE_NUMBER[k], which counts the number of instances in the video image when the MM values falls in the corresponding noise level interval.

TABLE 1

Noise level intervals for $3.2\sigma\pm6\sigma_1$.

| SNR | Range from mean | Desired mean |
| --- | --- | --- |
| 45 dB | 0~10 | 4.6 |
| 40 dB | 0~18 | 8.16 |
| 35 dB | 0~33 | 14.52 |
| 30 dB | 0~58 | 25.8 |
| 25 dB | 0~73 | 47.8 |

TABLE 2

Noise level intervals for $3.2\sigma\pm3\sigma_1$.

| SNR | Range from mean | Desired mean |
| --- | --- | --- |
| 51 dB | 0~4 | 2.29 |
| 45 dB | 1~8 | 4.58 |
| 39 dB | 3~15 | 9.13 |
| 33 dB | 7~29 | 18.22 |
| 27 dB | 15~58 | 36.36 |

In step 606, the MM parameters calculated by the MM calculation block 404 may be collected into corresponding noise level intervals determined in step 604. For example, when MM(x,y)<NOISE_RANGE_UPPER_THD[k] and MM(x,y)≧NOISE_RANGE_LOWER_THD[k], the value of MM(x,y) may be accumulated or added to the current value of NOISE_LEVEL[k] and the value of SAMPLE_NUMBER[k] may be incremented by one. The same approach may be followed with the remaining pixels in the current video image. In this regard, the values of NOISE_LEVEL[k] and SAMPLE_NUMBER[k] may be initialized to zero, for example, before the collection and accumulation operations start. When the value of the MM(x,y) parameter for the pixels in the current video image have been collected, the noise level for each noise level interval may be determined by the expression:

NOISE_LEVEL[k]=8*NOISE_LEVEL[k]/SAMPLE_NUMBER[k]  (16)

where the factor 8 may be utilized to maintain certain numerical precision in integer computation. The factor to be utilized in equation (16) may depend on the implementation and need not be limited to the value 8.

In step 608, the processor 104 may utilize the values of NOISE_LEVEL[k] and the values of SAMPLE_NUMBER[k] to determine the noise level for the current video image. In this regard, the processor 104 may utilize an early exit algorithm (EEA) or an interpolation estimate algorithm (IEA). The EEA, for example, may select the video image noise level base on a first noise level interval with a number of collected samples larger than a sample threshold, NUM_NOISY_SAMPLE_THD. The IEA, for example, may determine the video image noise level based on an average of a plurality of noise levels associated with noise level intervals with collected samples that are larger than the sample threshold.

In step 610, a noise level indicator (NLI) may be determined based on the noise level for the current video image, or based on the noise levels of the current video image and the P previous video images in order to remove jitter and/or smooth out the results. For example, the NLI may be determined based on the mean of the noise level of the current video image and the noise levels of the P previous video images. The NLI value in dB unit may be given by the expression:

$$NLI(\mathrm{dB}) = 20 \times \log_{10}\left(\frac{255 \times 25.6}{NLI}\right) \quad (17)$$

where NLI may be the noise level of the current video image, or the mean or the average noise level of the five most recent video images. The factor 25.6 utilized in equation (17) may depend on the factors used in equations (5), (6), (7) and (16). The factor 25.6 may need to be adjusted when, for example, a particular implementation chooses other factors for equations (5), (6), (7) and/or (16). After step 610, the process may proceed to end step 612.

Figure 7A:
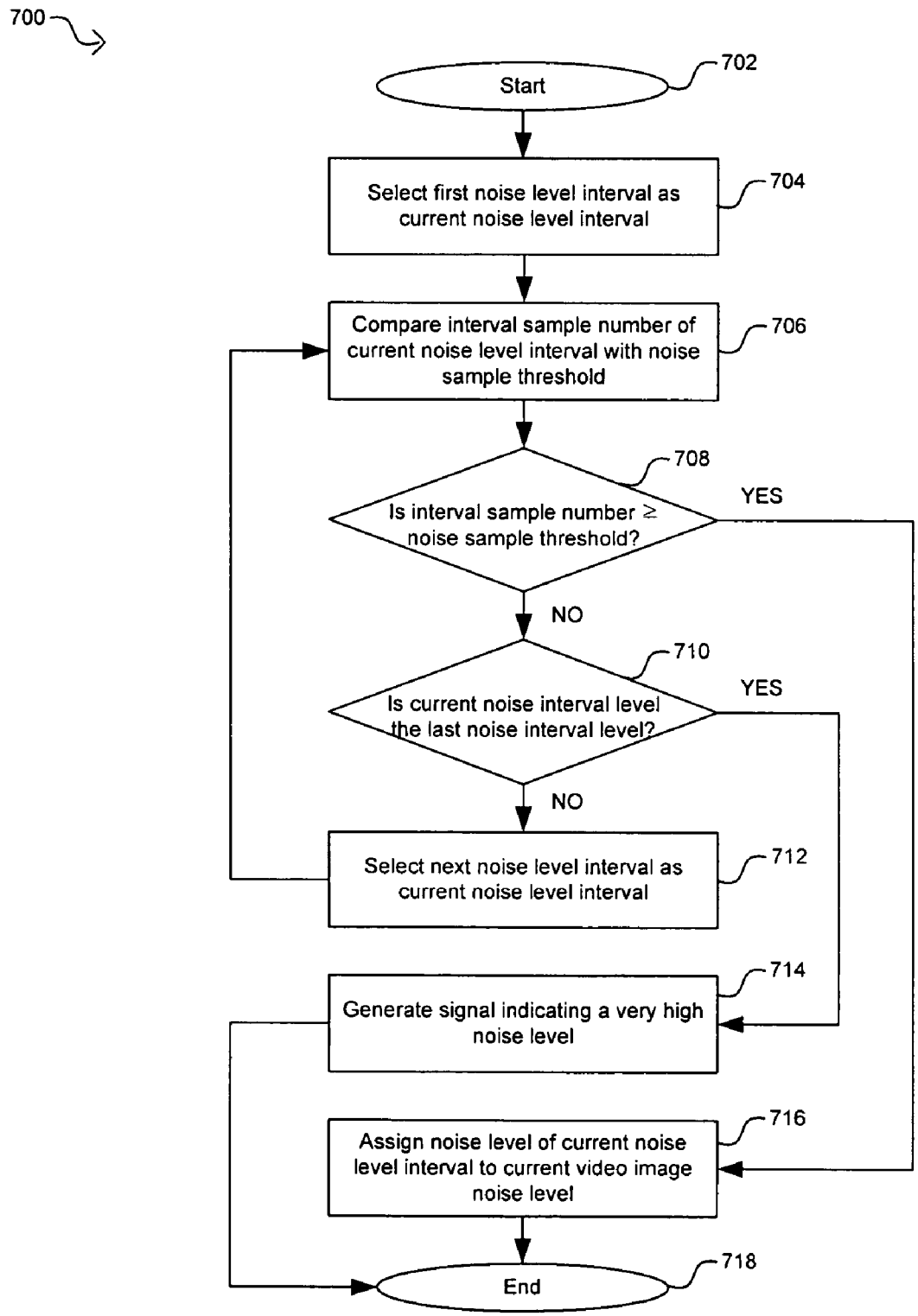
FIG. 7A is a flow diagram illustrating exemplary steps for estimating the video image noise level based on an early-exit algorithm (EEA), in accordance with an embodiment of the invention.

FIG. 7A is a flow diagram illustrating exemplary steps for estimating the video image noise level based on an early-exit algorithm (EEA), in accordance with an embodiment of the invention. Referring to FIG. 7A, there is shown a flow chart 700. In step 704, after start step 702, the first noise level interval, that is, the noise interval that corresponds to k=0, may be selected as the current noise level interval for the EEA operation. In this regard, the EEA operation may occur after the collection, accumulation, and averaging operations described in step 606 in FIG. 6 have been completed. In step 706, the number of samples or MM values collected into the current noise level interval may be compared to a noise sample threshold. In step 708, when the interval sample number in the current noise level interval is greater than or equal to the noise sample threshold, the process may proceed to step 716. In step 716, the current video image noise level is the average noise level determined for the current noise level interval. After step 716, the process may proceed to end step 718.

Returning to step 708, when the interval sample number in the current noise level interval is less than the noise sample threshold, the process may proceed to step 710. In step 710, when the current noise interval level is the last noise interval level for the current video image, the process may proceed to step 714. In step 714, a signal may be generated to indicate that the noise level for the current video image is a very high noise level. After step 714, the process may proceed to end step 718.

Returning to step 710, when the current noise interval level is not the last noise interval level for the current video image, the process may proceed to step 712. In step 712, a next noise level interval, that is, the noise interval that corresponds to k+1, may be selected as the current noise level interval for the EEA operation. After step 712, the process may return to step 706.

In an embodiment of the invention, the noise sample threshold may be given by a NUM_NOISY_SAMPLE_THD parameter, for example. The NUM_NOISY_SAMPLE_THD may be dynamically modified during operation. Moreover, the signal in step 714 that indicates a high noise level for the video image may correspond to a VERY_HIGH_NOISE_LEVEL signal, for example.

Figure 7B:
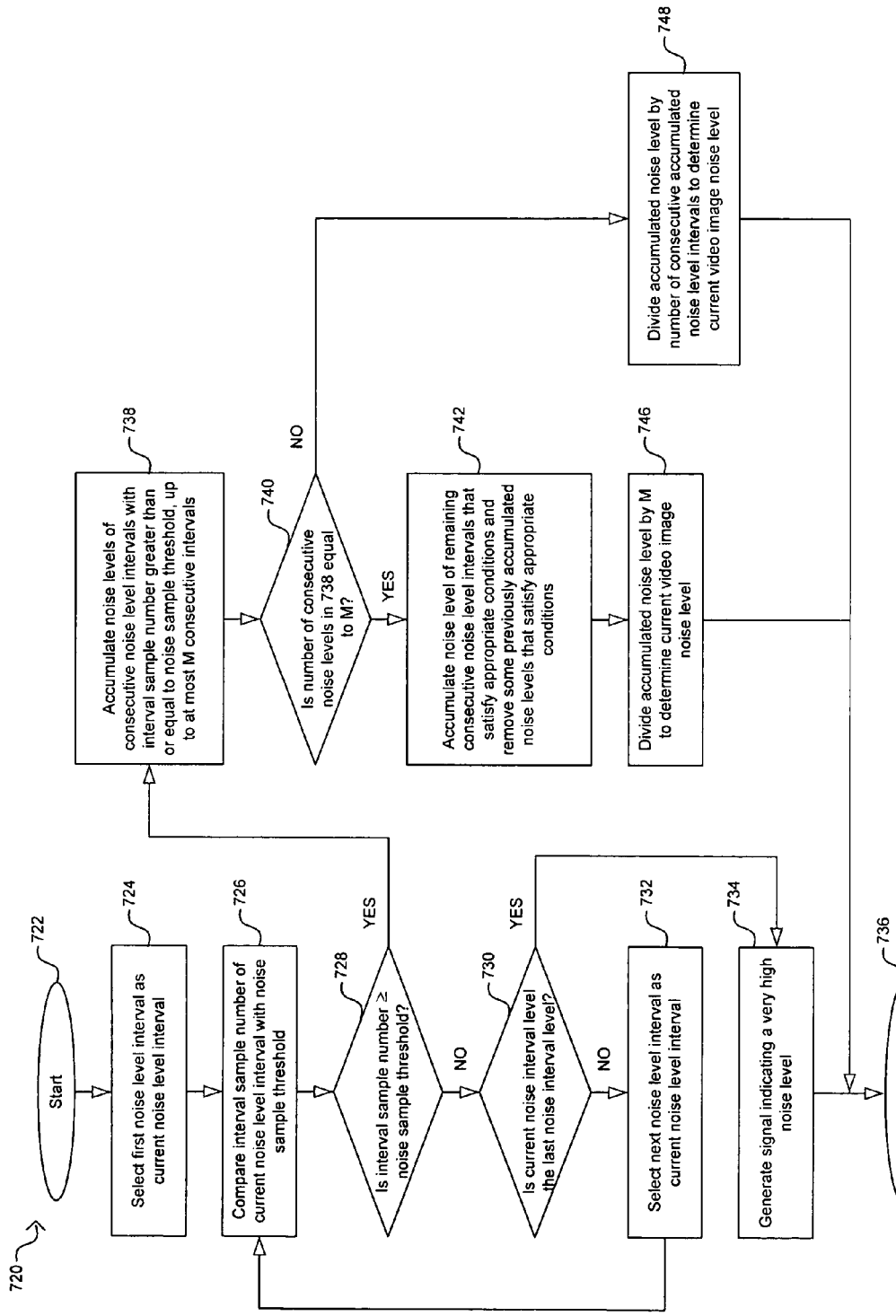
FIG. 7B is a flow diagram illustrating exemplary steps for estimating the video image noise level based on an interpolation estimate algorithm (IEA), in accordance with an embodiment of the invention.

FIG. 7B is a flow diagram illustrating exemplary steps for estimating the video image noise level based on an interpolation estimate algorithm (IEA), in accordance with an embodiment of the invention. Referring to FIG. 7B, there is shown a flow chart 720. In step 724, after start step 722, the first noise level interval, that is, the noise interval that corresponds to k=0, may be selected as the current noise level interval for the IEA operation. In this regard, the IEA operation may occur after the collection, accumulation, and averaging operations described in step 606 in FIG. 6 have been completed. In step 726, the number of samples or MM values collected into the current noise level interval may be compared to a noise sample threshold. In step 728, when the interval sample number in the current noise level interval is less than the noise sample threshold, the process may proceed to step 730.

In step 730, when the current noise interval level is the last noise interval level for the current video image, the process may proceed to step 734. In step 734, a signal may be generated to indicate that the noise level for the current video image is a very high noise level. After step 734, the process may proceed to end step 736. Returning to step 730, when the current noise interval level is not the last noise interval level for the current video image, the process may proceed to step 732. In step 732, a next noise level interval, that is, the noise interval that corresponds to k+1, may be selected as the current noise level interval for the IEA operation. After step 732, the process may return to step 726.

Returning to step 728, when the interval sample number in the current noise level interval is greater than or equal to the noise sample threshold, the process may proceed to step 738. In step 738, the noise levels for up to at most a maximum value M consecutive noise level intervals with interval sample number greater than or equal to the noise sample threshold are accumulated, that is, they are added together. In step 740, when the number of consecutive noise level intervals with interval sample number greater than or equal to the noise sample threshold is not equal to a maximum value M, the process may proceed to step 748. In step 748, the average noise level for the current video image is determined by dividing the accumulated noise level value by the number of consecutive noise level intervals with interval sample number greater than or equal to the noise sample threshold. After step 748, the process may proceed to end step 736.

Returning to step 740, when the number of consecutive noise level intervals with sample numbers greater than or equal to the noise sample threshold is equal to a maximum value M, the process may proceed to step 742. In step 742, the remaining noise intervals, if any, may be checked. The remaining noise level interval that is consecutive to the last noise level interval that is already accumulated may be accumulated to the already accumulated noise level value and the first noise level interval that is already accumulated may be removed from the already accumulated noise level value when at least two conditions are met. The first condition may require that the interval sample number of the noise level interval that is consecutive to the last noise level interval that is already accumulated be greater than a large sample threshold. The second condition may require that the difference between the interval sample number of the first noise level interval that is already accumulated and the noise sample threshold be less than a difference threshold. This approach may be performed until all remaining noise level intervals are checked.

In step 746, the average noise level for the current video image is determined by dividing the accumulated noise level value by M. After step 746, the process may proceed to end step 736.

In one embodiment of the invention, the noise sample threshold may be given by a NUM_NOISY_SAMPLE_THD parameter, for example. The NUM_NOISY_SAMPLE_THD may be dynamically modified during operation. The signal in step 714 that indicates a high noise level for the video image may correspond to a VERY_HIGH_NOISE_LEVEL signal, for example. The difference threshold in step 742 may be given by a NUMDIFF_THD parameter, for example. In this regard, the first condition in step 742 may be given by the expression SAMPLE_NUMBER[i]-NUM_NOISY_SAMPLE_THD<NUMDIFF_THD, where i is the index for the first noise level interval that is already accumulated. Moreover, the large sample threshold in step 742 may be given by a NUM_NOISY_SAMPLE_THD_BIG parameter, for example. In this regard, the second condition in step 742 may be given by the expression SAMPLE_NUMBER[k]>NUM_NOISY_SAMPLE_THD_BIG, where k is the index for the remaining noise level that is consecutive to the last noise level interval that is already accumulated.

The early-exit algorithm (EEA) and the interpolation estimate algorithm (IEA) described herein may be utilized to determine the analog noise level of a video frame or video field based on operations that are more tightly coupled to the content of the video signal. Moreover, at least some of the operations that may be utilized to perform noise reduction of the analog video signal may also be utilized to detect the noise level in the video signal.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling analog signals in video systems, the method comprising:
   in a video processing system:
      selecting one or more filtering modes;
      determining motion metric (MM) values, for pixels in a video image, within a noise level interval over a plurality of said noise level intervals, wherein said MM values are determined based on said selected one or more filtering modes; and
      determining a noise level for at least a portion of said video image based on a noise level that is calculated for at least a portion of said plurality of noise level intervals corresponding to said at least a portion of said video image.

2. The method according to claim 1, further comprising generating an interval sample value for each of said plurality of noise level intervals based on said determined MM values for each corresponding said noise level interval.

3. The method according to claim 2, further comprising determining said noise level for said at least a portion of said video image based on said generated interval sample value and a noise sample threshold.

4. The method according to claim 3, further comprising sequentially comparing said generated interval sample to said noise sample threshold.

5. The method according to claim 4, further comprising selecting said determined noise level for said at least a portion of said video image video image to be a first of said sequentially compared generated interval sample value that is greater than or equal to said noise sample threshold.

6. The method according to claim 1, further comprising selecting a plurality of generated interval sample values for each of said plurality of noise level intervals that are greater than or equal to a noise sample threshold.

7. The method according to claim 6, further comprising averaging said noise level calculated for said plurality of noise level intervals that correspond to said selected plurality of generated interval sample values.

8. The method according to claim 7, further comprising selecting said determined noise level for said at least a portion of said video image to be said average noise level.

9. The method according to claim 1, further comprising determining a noise level indicator (NLI) for said at least a portion of said video image based on an average noise level determined from said video image.

10. The method according to claim 1, further comprising determining a noise level indicator (NLI) for said at least a portion of said video image based on an average noise level determined from at least one previous video image.

11. A non-transitory machine-readable storage having stored thereon, a computer program having at least one code for handling analog signals in video systems, the at least one code section being executable by a machine for causing the machine to perform steps comprising:
  selecting one or more filtering modes;
  determining motion metric (MM) values, for pixels in a video image, within a noise level interval over a plurality of said noise level intervals, wherein said MM values are determined based on said selected one or more filtering modes; and
  determining a noise level for at least a portion of said video image based on a noise level that is calculated for at least a portion of said plurality of noise level intervals corresponding to said at least a portion of said video image.

12. The non-transitory machine-readable storage according to claim 11, further comprising code for generating an interval sample value for each of said plurality of noise level intervals based on said determined MM values for each corresponding said noise level interval.

13. The non-transitory machine-readable storage according to claim 12, further comprising code for determining said noise level for said at least a portion of said video image based on said generated interval sample value and a noise sample threshold.

14. The non-transitory machine-readable storage according to claim 13, further comprising code for sequentially comparing said generated interval sample to said noise sample threshold.

15. The non-transitory machine-readable storage according to claim 14, further comprising code for selecting said determined noise level for said at least a portion of said video image to be a first of said sequentially compared generated interval sample value that is greater than or equal to said noise sample threshold.

16. The non-transitory machine-readable storage according to claim 11, further comprising code for selecting a plurality of generated interval sample values for each of said plurality of noise level intervals that are greater than or equal to a noise sample threshold.

17. The non-transitory machine-readable storage according to claim 16, further comprising code for averaging said noise level calculated for said plurality of noise level intervals that correspond to said selected plurality of generated interval sample values.

18. The non-transitory machine-readable storage according to claim 17, further comprising code for selecting said determined noise level for said at least a portion of said video image to be said average noise level.

19. The non-transitory machine-readable storage according to claim 11, further comprising code for determining a noise level indicator (NLI) for said at least a portion of said video image based on an average noise level determined for said video image.

20. The non-transitory machine-readable storage according to claim 11, further comprising code for determining a noise level indicator (NLI) for said at least a portion of said video image based on an average noise level determined from at least one previous video image.

21. A system for handling analog signals in video systems, the system comprising:
  circuitry within a chip that enables selecting one or more filtering modes;
  said circuitry within a chip that enables determining motion metric (MM) values, for pixels in a video image, within a noise level interval over a plurality of said noise level intervals, wherein said MM values are determined based on said selected one or more filtering modes; and
  said circuitry within said chip enables determination of a noise level for at least a portion of said video image based on a noise level that is calculated for at least a portion of said plurality of noise level intervals corresponding to said at least a portion of said video image.

22. The system according to claim 21, said circuitry within said chip enables generation of an interval sample value for each of said plurality of noise level intervals based on said determined MM values for each corresponding said noise level interval.

23. The system according to claim 22, said circuitry within said chip enables determination of said noise level for said at least a portion of said video image based on said generated interval sample value and a noise sample threshold.

24. The system according to claim 23, said circuitry within said chip enables sequential comparison of said generated interval sample to said noise sample threshold.

25. The system according to claim 24, said circuitry within said chip enables selection of said determined noise level for said at least a portion of said video image video image to be a first of said sequentially compared generated interval sample value that is greater than or equal to said noise sample threshold.

26. The system according to claim 21, said circuitry within said chip enables selection of a plurality of generated interval sample values for each of said plurality of noise level intervals that are greater than or equal to a noise sample threshold.

27. The system according to claim 26, said circuitry within said chip enables averaging of said noise level calculated for said plurality of noise level intervals that correspond to said selected plurality of generated interval sample values.

28. The system according to claim 27, said circuitry within said chip enables selection of said determined noise level for said at least a portion of said video image to be said average noise level.

29. The system according to claim 21, said circuitry within said chip enables determination of a noise level indicator (NLI) for said at least a portion of said video image based on an average noise level determined for said video image.

30. The system according to claim 21, said circuitry within said chip enables determination of a noise level indicator (NLI) for said at least a portion of said video image based on an average noise level determined from at least one previous video image.

* * * * *